Patented Apr. 21, 1931

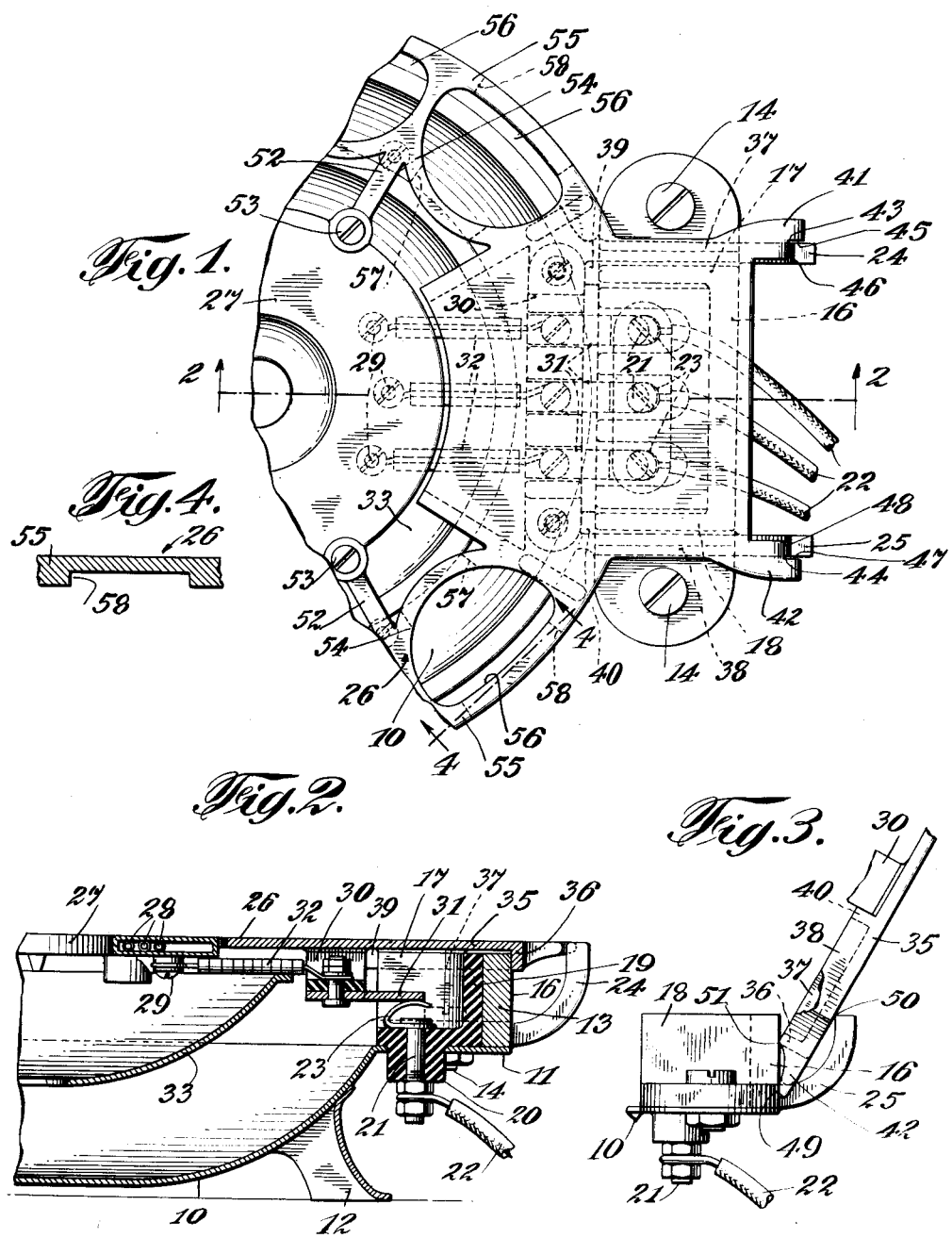

1,801,614

UNITED STATES PATENT OFFICE

LEMUEL W. SERRELL, OF NEW YORK, N. Y., ASSIGNOR TO SERELCO, INC., OF NEW YORK, N. Y., A CORPORATION OF DELAWARE

ELECTRIC HEATER

Application filed June 29, 1928, Serial No. 289,151. Renewed September 5, 1930.

The public in general and housewives in particular have now come to appreciate the necessity, as well as the advisability of cleanliness in so far as cooking utensils and cooking apparatus in general are concerned. Long since public utility corporations have recognized and particularized in the use of devices which reduce to a minimum the servicing cost of all apparatus in which these concerns are interested. Now my present invention relates to a heater and an electric heater which may be associated with an electric range or used independently thereof and so constructed that the parts thereof are easily cleaned and the cost of servicing is substantially negligible. At the same time I have associated with the invention a means for concentrating the heat on the bottom of the smaller cooking utensils, thus increasing the speed of the cooking and also when larger cooking utensils are used, a means for permitting the heat to spread over the bottom of said utensils more rapidly, thus decreasing the danger of the heat coil becoming overheated, shortening its life and making its servicing more frequent.

In carrying out the invention the electric heater made in accordance therewith preferably comprises a base, a grate carrying a heat coil and so associated with the base that it is tiltable relatively thereto from a normal position for use to one in which all the parts of the device may be readily cleaned, and the association is also such that the grate and heater coil element may be entirely removed from the base in any position. The construction is also such that when in its normal operative position the necessary connections from suitable terminals in the base are automatically made to the heat coils and these connections automatically broken when the grate and its heat coil are tilted to an inoperative position, or when they are entirely removed from the base, as will be hereinafter more particularly described.

Associated with said grate and heating element, I place a reflector under the heating element to concentrate the heat on the bottom of the cooking utensil. The rim of this reflector is placed below the under side of the cross members that tie the arms of the grate together, in such a way that when a large pot is placed on the top of the grate there is nothing to interfere with the circulation of the heated air. The heated air may escape over the rim of the reflector and spread out under the grate, rising through the recesses and openings in the grate, thus coming into contact with the under side of the cooking utensil, both increasing the efficiency of the cooking and prolonging the life of the heating element.

In the drawing Figure 1 is a partial plan of an electric heater, illustrating that part thereof relating to the present invention, Fig. 2 is a section on line 2—2, Fig. 1, Fig. 3 is a partial elevation illustrating the grate in a tilted position, and Fig. 4 is a section on line 4—4, Fig. 1.

By reference to the drawing it will be seen that in carrying out this invention the electric heater made in accordance therewith is constructed to include a base 10 which is preferably made in the form of a tray. The base 10 is preferably flanged, as indicated at 11. The base 10, as illustrated, is also provided with feet 12.

With this structure the heater is adapted for use either by being set into a burner opening provided therefor in the top of a range, in which instance, of course, the flange 11 rests upon the range top, or for use by being supported upon the feet 12 on a table or any other suitable support.

Connected in a suitable position in the flange 11 there is a bracket 13. This bracket may be fixed in place by means of bolts 14 or otherwise. In order to comprise a terminal casing, which is one of the functions of the bracket, the same is constructed to include an end wall 16, and side walls 17 and 18. Within this bracket I employ a terminal block 19. As illustrated the terminal block includes a lug 20 which extends through an opening provided therefor in the flange 11. In the terminal block there are arranged a series of terminals 21. These may be of any suitable construction adapted to have connected thereto the lead wires 22. Associated with each terminal there is a spring contact 23.

In addition to forming a terminal housing the bracket 13 is also constructed to function as a support for a grate forming part of the heater. For this purpose extending from the end or rear wall 16 of the bracket I employ support arms 24 and 25. These support arms may be continuations of the side walls as indicated, or, if necessary, may be otherwise located, and in any event they are preferably curved, as clearly illustrated in Figs. 2 and 3.

The electric heater also includes a grate in which the heater or resistance coils are incorporated. The grate is indicated at 26, and is constructed to include a heater element 27 which is preferably hollow and in the form of a disc so as to contain coils 28. The terminals of these coils, as indicated at 29, are preferably located on the inner or under side of the heater element.

Suitably connected in the grate there is a terminal block 30. This terminal block 30 carries a plurality of terminal bars 31 corresponding in number with the terminals 21 and each adapted when the grate is in position to contact with a corresponding contact spring 23. The terminals of the heater coils are connected to the terminal bars 31 by suitable connectors 32. The grate also preferably includes a parabolic reflector 33, and the heater element 27 and the reflector 33 may be secured in position in the grate in any suitable manner so as to be readily detachable therefrom.

The grate is constructed to include a cap extension adapted to co-operate with the bracket for positioning the grate, making the grate tiltable relatively to the base and also making the grate in its entirety removable as a unit in any position from the base. This cap extension of the grate is indicated at 35 and includes an end wall or flange 36, side walls 37 and 38 and inner walls 39 and 40. The wall 36 is adapted to engage the wall 16 of the bracket, the walls 37 and 38 to engage the side walls 17 and 18 of the bracket and the inner walls 39 and 40 to engage the inner ends of the side walls 17 and 18, whereby as will be understood this extension forms a cap adapted to fit over the bracket and thereby to position the grate relatively to the base and at the same time to automatically cause the terminal bars to engage with the spring terminals to complete the electric circuits to the heat coils.

The extension cap is furthermore provided with protruding arms 41 and 42. These, as illustrated, are notched at 43 and 44 thereby providing faces 45 and 46 in the arm 41 and corresponding faces 47 and 48 in the arm 42. The faces 45 and 47 are adapted to bear against the outer faces of the support arms 24 and 25 while the faces 46 and 48 are adapted when the grate is tilted to bear against the curved surfaces of the support arms 24 and 25 whereby, as will be understood, the grate may be tilted from its normal operative position as shown in Fig. 2 to that shown in Fig. 3 wherein the edges 49 of the faces 46 and 48 bear against the outer face of the wall 16, the edge 50 at the extremities of the support arms contact with the outer faces of the cap extensions of the grate and likewise the edge 51 of the wall of the flange 36 also bears against the outer face of the wall 16 forming a support for the grate when tilted to this position and in which, of course, as will be understood, the electrical contacts are separated whereby the circuits to the heat coils are broken. It will be also readily understood from the foregoing description that while the grate is normally centered or positioned relatively to the base by means of the cap fitting the bracket, whereby also electric connections are automatically made, the grate as a unit is also entirely removable from the base in any position that the grate may assume relatively to the base. The grate member 26 is so constructed as to include radially disposed arms 52 by means of which through suitable bolts or rivets 53 or otherwise the heater element 27 is secured in position while the peripheral portion of the grate includes spaced arms 54 and 55 connecting the radial arms and provided with openings 56. On the underside of the connecting arms 54 and 55 the same are recessed, as indicated at 57 and 58. This structure, as will be readily understood permits the heat to be directly reflected against the bottom of a relatively small pot or pan when placed on the heater and when a relatively large pot or pan is placed on the heater the heat is permitted to mushroom over the edge of the reflector and to pass through the recesses 57 and the openings 56 to contact with the outer portions of the bottom of the pot or pan while any excess of the currents of heated air may escape by way of the recesses 58.

No doubt it will now be appreciated that an electric heater made as heretofore described is so constructed that the parts thereof may be readily cleaned and, furthermore, that the heater may be serviced at an absolute minimum of cost.

I claim as my invention:

1. In an electric heater, a base, a grate having a series of apertures in the peripheral portion thereof and inner and outer recesses in the underside of the peripheral portion of the grate, an electric heater element associated with the grate, and a reflector, the said reflector being so placed as to directly reflect the heat created by the heater element against the bottom of a relatively small vessel when placed on the grate, and when a relatively large vessel is placed on the grate the heat from the heater element is permitted to pass over the edge of the reflector and through the said inner recesses and into said apertures in the bottom of the grate to be retained therein to contact with the outer portions of the bottom of the said larger vessel and finally to pass out by way of the said outer recesses.

2. In an electric heater, a base, a grate, an electric heater element in the grate, a bracket including arcuate arms extending from the base, and a cap connected to the grate and having extensions adapted to engage the upper and side surfaces of the said arms to operatively position the grate relatively to the base and whereby the grate as a unit is tiltable and supportable in a raised position relatively to the base and is removable therefrom when in any position by being moved in a straight upward direction.

3. In an electric heater, a base, a grate, an electric heater element therein, a bracket including spaced curved arms extending from the base, a cap member extending from the grate, and spaced protruding arms extending from the cap member and having parts engaging the surfaces of the curved arms to position the grate relatively to the base and to make the grate tiltable relatively to the base and also to support the grate in a tilted position, the grate being removable as a unit when in any position by being moved in an upward direction from the base.

4. In an electric heater, a base, a grate, an electric heater element therein, a bracket extending from the base and including upwardly curved arms, a cap member extending from the grate, protruding arms extending from the cap member, the said protruding arms having parts adapted to engage the curved surfaces of the said curved arms, and parts adapted to engage the outer surfaces of the said curved arms to position the grate relatively to the base to make the grate tiltable and supportable in a raised position relatively to the base and whereby the grate is removable as a unit in any position by being lifted in a straight upward direction relatively to the base.

5. In an electric heater, a base, a grate, an electric heater element therein, a bracket extending from the base and including upwardly curved arms, a cap member extending from the grate, protruding arms extending from the cap member, the said protruding arms having parts adapted to engage the curved surfaces of the said curved arms, parts adapted to engage the outer surfaces of the said curved arms to position the grate relatively to the base to make the grate tiltable and supportable in a raised position relatively to the base and whereby the grate is removable as a unit in any position by being lifted in an upward direction relatively to the base, conductor bars mounted in the grate and connected to the heater element therein, and a set of yieldable contacts carried by the said base and adapted to be engaged by the said conductor bars when the grate is positioned relatively to the base and supported thereby.

Signed by me this 14 day of June, 1927.

LEMUEL W. SERRELL.